United States Patent [19]

Ii

[11] Patent Number: 5,121,264
[45] Date of Patent: Jun. 9, 1992

[54] METHOD AND APPARATUS FOR REPRODUCTION OF MAGNETIC TAPE BY USING ROTARY DRUM HEADS

[75] Inventor: Hiroshi Ii, Higashihiroshima, Japan

[73] Assignee: Sharp Kabushiki Kaisha, Osaka, Japan

[21] Appl. No.: 347,255

[22] Filed: May 4, 1989

[30] Foreign Application Priority Data

May 10, 1988 [JP] Japan .................................. 63-113809

[51] Int. Cl.⁵ ........................ G11B 15/14; H04N 5/78
[52] U.S. Cl. ..................................... 360/64; 360/10.3
[58] Field of Search .............................. 360/64, 32, 67

[56] References Cited

U.S. PATENT DOCUMENTS

| 3,580,992 | 5/1971 | Eguchi et al. | 360/64 |
| 4,688,115 | 8/1987 | Takahashi et al. | 360/64 |
| 4,819,099 | 4/1989 | Saito | 360/64 |

FOREIGN PATENT DOCUMENTS 0198563 12/1982 Japan .................................. 360/64

OTHER PUBLICATIONS

EP-A-26320 (International Business Machines Corporation) p. 12, line 19 p. 16, line 24; FIG. 2.

WO-A-8200558 (Spin, Physics, Inc.) p. 7, line 23–p. 9, line 24; FIG. 2.

EP-A-80297 (Sony Corporation) the whole document.

Primary Examiner—Aristotelis Psitos
Assistant Examiner—Varsha V. Sheladia

[57] ABSTRACT

Two magnetic heads having different azimuth angles are mounted spaced from each other on a cylindrical rotary drum. Data is recorded on a magnetic tape using of the magnetic heads. On the magnetic tape, one track is formed by one of the magnetic heads and another (second) track is formed by another magnetic head. The two tracks form one frame on the tape. The data is recorded in the unit of one frame. When reproducing, the data recorded in one track is read out by one magnetic head, and the data recorded in the other track is read out by the other magnetic head. When reproducing in the normal direction, the data in one frame is first read out on one track and then on the other track. When reproducing in the reverse direction, first the data of the other track is read out, and the data is fed into a delay circuit composed of memory. The delay circuit, after the data of one track is read out and output, outputs the data of the other track. Also in reproduction in the reverse direction, the data composing one frame is output in the same sequence as in reproduction in the normal direction.

11 Claims, 5 Drawing Sheets

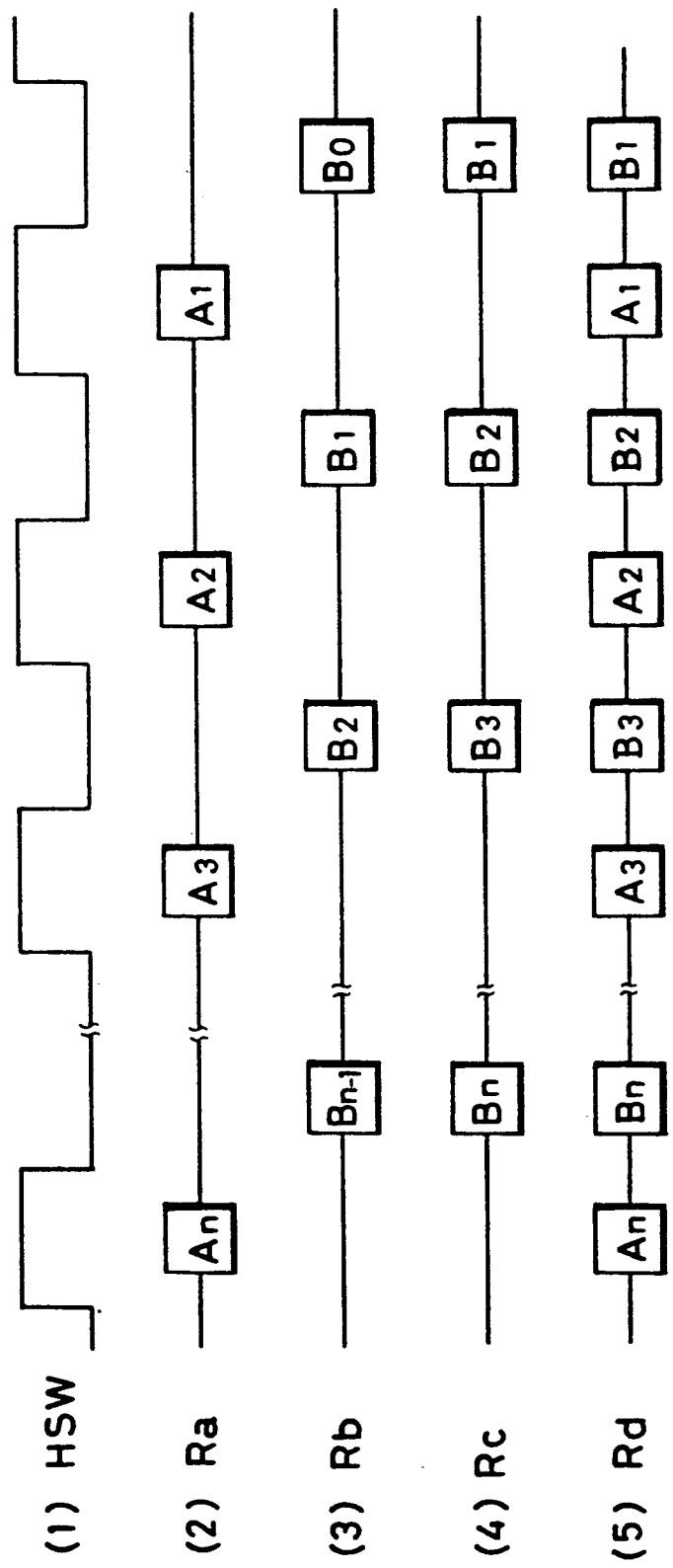

METHOD AND APPARATUS FOR REPRODUCTION OF MAGNETIC TAPE BY USING ROTARY DRUM HEADS

BACKGROUND OF THE INVENTION

1. Field of the Invention

The present invention relates to a method and apparatus for reproduction on magnetic tape by using rotary drum heads which is used for example, in a digital audio tape recorder of rotary head system (R-DAT).

2. Description of the Prior Art

The apparatus for recording/reproducing audio signals converted into digital signals or digital data in a magnetic tape has been realized. In such apparatus, in order to increase the quantity of data recorded on a magnetic tape, magnetic heads differing in azimuth angle are attached to a rotary drum, and the magnetic tape is scanned while rotating the rotary drum so as to record/ reproduce the data.

FIG. 1 shows a track pattern of a magnetic tape 1 in which data is written in such manner. A track Ai (i=0, 1, 2, ..., n) is, for example, composed of the data written through a magnetic head possessing a positive azimuth angle, and a track Bi is composed of, for example, the data written through a magnetic head having a negative azimuth angle.

To reproduce in the normal direction, the rotary drum is rotated in the direction of arrow 13 on a magnetic tape 1 running in the direction of arrow 11. The magnetic head having the positive azimuth angle and the magnetic head having the negative azimuth angle alternately scan the tracks Ai, Bi, and read out the data written in the track Ai, Bi. Therefore, the data written on the magnetic tape 1 are reproduced in the sequence of tracks A0, B0, A1, B1, ..., An, Bn. Such reproduced signals are led out as shown in FIG. 2 (2).

Usually, a set of tracks Ai, Bi makes up one frame Fi. Rearrangement of data sequence in recording of the data on the magnetic tape 1, that is, the so-called interleaving, is complete within this one frame. Accordingly, the reproduced data is processed in the unit of one frame.

A processing circuit for processing the reproduced data distinguishes a pair of tracks composing one frame, on the basis of the track identification signal obtained by detecting the rotation of the rotary drum. This track identification signal is, as shown in FIG. 2 (1), at high level when the data of the track Ai, for example, is reproduced, and at low level when the data of the track Bi is reproduced. The processing circuit processes the reproduction signals which have been led out in the high level period of the track identification signal and in the low level period succeeding this high level period, as the data of one frame.

In this way, the magnetic tape reproducing apparatus can correctly process the data of tracks Ai, Bi composing one frame Fi.

In such magnetic tape reproducing apparatus, when reproducing in the reverse direction by running the magnetic tape in the direction indicated by arrow 12, the signal led out from the magnetic head is shown in FIG. 3 (2). The track identification signal at this time is as shown in FIG. 3 (1). The processing circuit for processing the reproduced signals recognizes the reproduced signals which have been led out in the high level period of the track identification signal and the low level period succeeding the high level period as one frame, and therefore in the reproduction in the reverse direction, it may be misunderstood that the tracks Ai+1 and Bi compose one frame. In such apparatus, hence, normal reproduction action in the reverse direction cannot be effected.

SUMMARY OF THE INVENTION

It is hence a primary object of the invention to solve the above technical problems, and present a method and apparatus for reproduction of magnetic tape by using rotary drum heads capable of reproducing in the reverse direction normally in a simple structure.

To achieve the above object, the invention presents a magnetic tape reproducing method using rotary drum heads, wherein a magnetic tape is read by using a rotary drum to which one or more each of magnetic heads having two different azimuth angles are attached at a spacing in the peripheral direction, a frame is composed, on this magnetic tape, of a pair of one track formed by a magnetic head having one azimuth angle, and another track of a magnetic head having the other azimuth angle, one track is read by the magnetic head having one azimuth angle, and the other track is read by the magnetic head having the other azimuth angle, this track and other track are led out in this sequence when reproducing in the normal direction, the content of the other track composing one frame is delayed, when reproducing in the reverse direction, so as to be led out after reading of the content of the first track composing one frame together with the content of the other track, and the output of the magnetic head having one azimuth angle and the content of the other track being delayed are received, and the two tracks composing one frame are led out in the same sequence as in the reproduction in the normal direction.

According to the invention, the data recorded in a magnetic tape is read out by using a rotary drum comprising one each or more of magnetic heads having two different azimuth angles at a spacing in the peripheral direction. In this magnetic tape, one track is formed by a magnetic head having one azimuth angle, and the other track is formed by the magnetic head having the other azimuth angle. One track and the other track make up a pair to compose one frame. One track is read by the magnetic head having one azimuth angle, and the other track is read by the magnetic head having the other azimuth angle.

When reproducing in the normal direction, the contents of one track and other track are read out by the magnetic heads and led out in this sequence, and when reproducing in the reverse direction, the content of the other track composing one frame is delayed so as to be led out after reading of the content of the first track composing one frame together with the content of the other track. In this way, the two tracks composing one frame can be led out in the same sequence as in reproduction in the normal direction.

Thus, according to the invention, only by adding a simple structure, it is possible to realize a magnetic tape reproducing method using rotary drum heads capable of reproducing in the reverse direction correctly.

The invention also presents a magnetic tape reproducing apparatus using rotary drum heads comprising:

a rotary drum comprising one each or more of spacing in the peripheral direction being rotated in a predetermined direction, a magnetic tape sliding in contact with the rotary drum, and means for driving the magnetic tape running for driving the magnetic tape in a first predetermined direction and in a second running direction reverse to the first direction, wherein the magnetic tape has a frame composed thereon of a pair of one track formed by a magnetic head having one azimuth angle, and other track formed by a magnetic head having the other azimuth angle, having one track read by the magnetic head having one azimuth angle, and the other track read by the magnetic head having the other azimuth angle; further comprising means for detecting the reading state for leading out the signals for expressing the reading state of the magnetic heads having two different azimuth angles, a delay circuit for delaying the output of one of the magnetic heads for a period of one frame, a first changeover switch for changing over and leading out the output of one magnetic head and the output of the delay circuit, a second changeover switch for changing over and leading out the output of the other magnetic head and the output of the first changeover switch by changing over the connection state of the two in every half period of the frame period, means for setting the first and second running directions of the magnetic tape, and means for controlling for driving the magnetic tape in the first or second running direction predetermined by the magnetic running driving means in response to the switch in the connection state for leading out the output one magnetic head when the first running direction is set, and setting the first changeover switch in the connection state for leading out the output of the delay circuit when the second running direction is set by the setting means.

The invention also relates to a method and apparatus for reproducing magnetic tape using rotary drum heads in which digital signals are stored in the magnetic tape.

The invention moreover presents a method and apparatus for reproducing magnetic tape using rotary drum heads in which the digital signals are audio signals.

The invention further presents a method and apparatus for reproducing magnetic tape using rotary drum heads in which the digital signals are video signals.

BRIEF DESCRIPTION OF THE DRAWINGS

These and other objects of the invention, as well as the features and advantages thereof, will be better understood and appreciated from the following detailed description taken in conjunction with the drawings, in which:

FIG. 7 is a timing chart explaining the operation in reproduction in reverse direction of the magnetic tape reproducing apparatus 15.

DETAILED DESCRIPTION OF THE PREFERRED EMBODIMENTS

Figure 1:
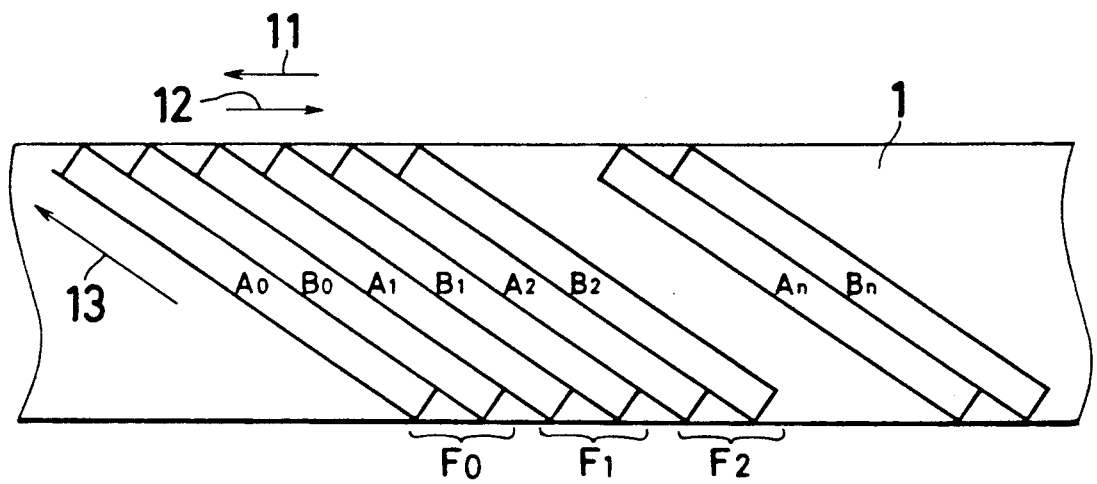
FIG. 1 is a drawing showing a track pattern of a magnetic tape 1 according to the prior art and the present invention.
Figure 2:
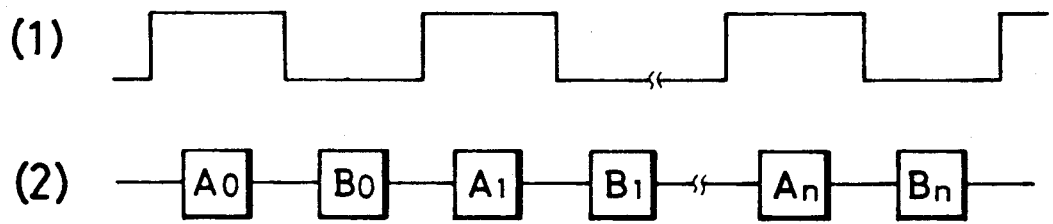
FIG. 2 is a timing chart for explaining the operation in reproduction in normal direction of a conventional magnetic tape reproducing apparatus.
Figure 3:
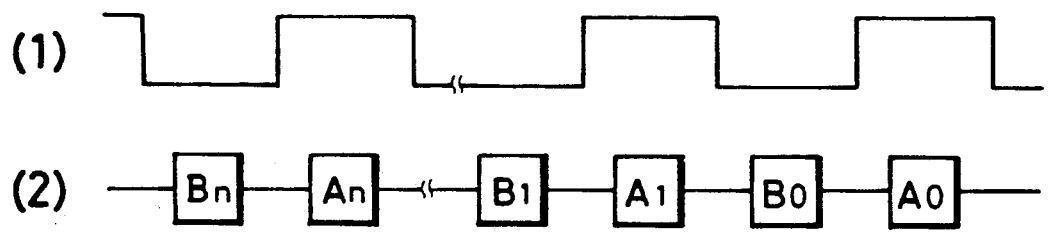
FIG. 3 is a timing chart for explaining the operation in reproduction in reverse direction of a conventional magnetic tape reproducing apparatus.

Referring now to the drawings, preferred embodiments of the invention are described in details below.

Figure 4:
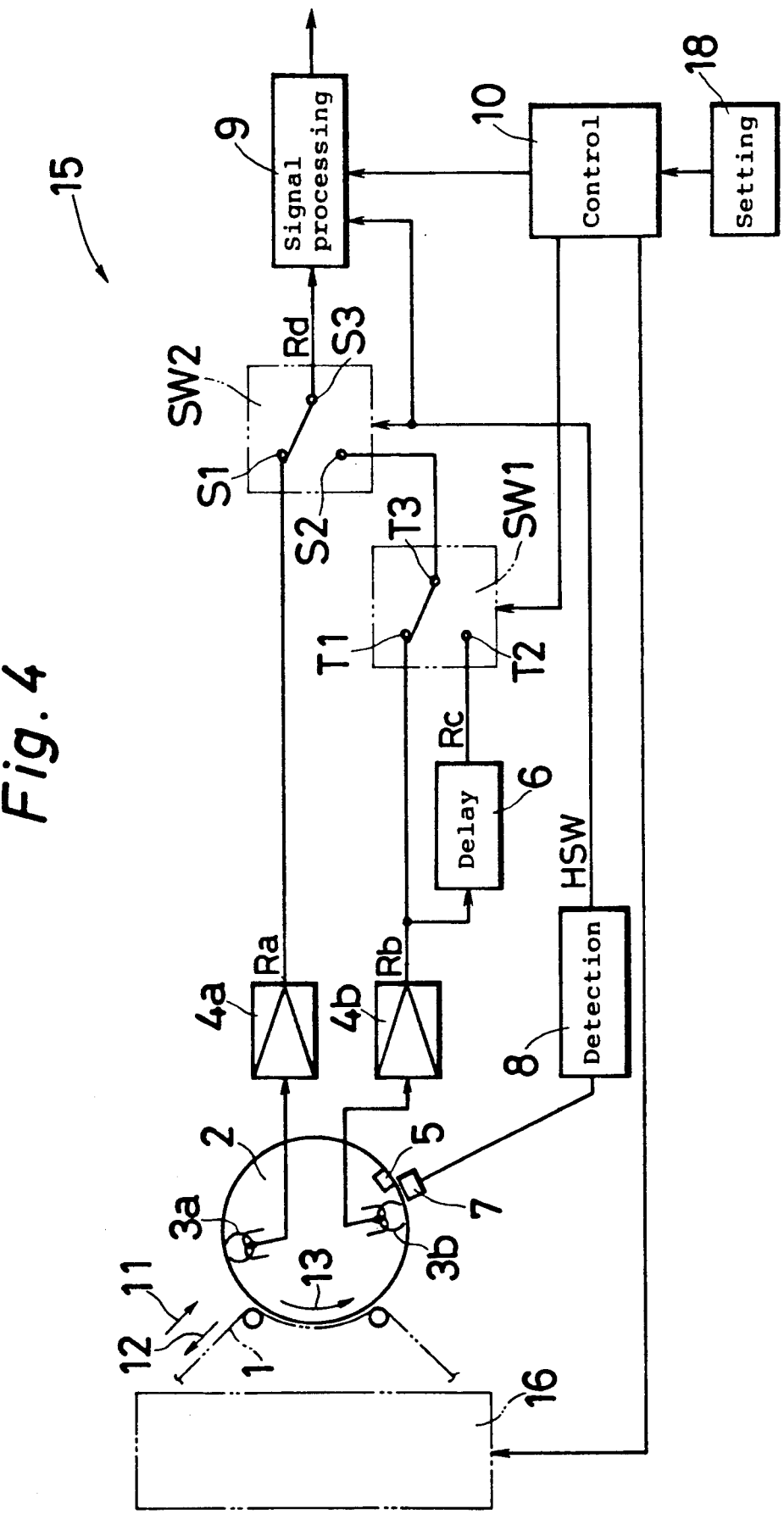
FIG. 4 is a block diagram showing the structure of a magnetic tape reproducing apparatus 15 of rotary drum head type according to one of the embodiments of the invention.

FIG. 4 is a block diagram showing the constitution of a magnetic tape reproducing apparatus 15 of rotary head type according to one of the embodiments of the invention. The magnetic tape reproducing apparatus 15 is composed of a rotary drum 2, a delay circuit 6, changeover switches SW1, SW2, a signal processing circuit 9, a control circuit 10, means for driving magnetic tape running 16, and means for setting 18. At the side of the cylindrical rotary drum 2, magnetic heads 3a, 3b opposing at 180 degrees to each other are disposed. The magnetic heads 3a, 3b are mounted on the rotary drum 2 at different azimuth angles in order to prevent noise due to crosstalk. The magnetic tape 1 is wound around the side of the rotary drum 2 for the portion of about 90 degrees, and is driven by the magnetic tape running driving means 16. The rotary drum 2 is rotated by a motor (not shown) in the direction of arrow 13. The rotation of the rotary drum 2 is detected by a magnet 5 attached to the rotary drum 2 and a detecting element 7 fixed near the rotary drum 2. This detecting element 7 is, for example, a hole element, and a pulse is generated when the magnet 5 passes near the detecting element 7, and is given to a detecting circuit 8.

On the magnetic tape 1, as shown in FIG. 1, tracks Ai (i=0, 1, 2, ..., n) formed by the magnetic head 3a, and tracks Bi formed by the magnetic head 3b are alternately formed. The data to compose the tracks Ai, Bi is rearranged and recorded in a method called interleaving when recording on magnetic tape 1. A pair of tracks Ai, Bi make up one frame Fi. The rearrangement by interleaving is completed within this frame Fi.

The contents of tracks Ai, Bi in the magnetic tape 1 are read out by corresponding magnetic heads 3a, 3b, respectively. The signals from the magnetic heads 3a, 3b are amplified by amplifiers 4a, 4b. The output of the amplifier 4a, that is, signal Ra is given to a terminal S1 of the changeover switch SW2.

The signal Rb output from the amplifier 4b is given to a terminal T1 of the changeover switch SW1, and is also applied to the delay circuit 6. The delay circuit 6 comprises memory and others, and it delays this signal Rb by one period of the rotation of the rotary drum 2 to make into signal Rc. The signal Rc is output to a terminal T2 of the changeover switch SW1.

The changeover switch SW1 connects with a terminal T3 by selectively changing over either one of the terminals T1, T2, according to the control signal output from the control circuit 10 which is stated below. This terminal T3 is connected to a terminal S2 of the changeover switch SW2.

The changeover switch SW2 causes either one of the terminals S1, S2 to connect selectively with the terminal S3, according to a signal HSW. The signal Rd led out from the terminal S3 is given to a signal processing circuit 9. The data composing this signal Rd is subjected to interleaving. parity check or other signal processing in the signal processing circuit 9, and the data subjected to such signal processing is output, for example, to a digital/analog converter.

The control circuit 10 controls the operating state of the magnetic tape reproducing apparatus 15, and outputs to the switch SW1 a control signal which is, for example, at high level in reproduction in normal direction and at low level in reproduction in reverse direction. The control circuit 10 also outputs a control signal to the magnetic tape running driving means 16.

The setting means 18 possesses operation buttons or the like for setting the reproduction in normal direction and reproduction in reverse direction as mentioned later.

Figure 5:
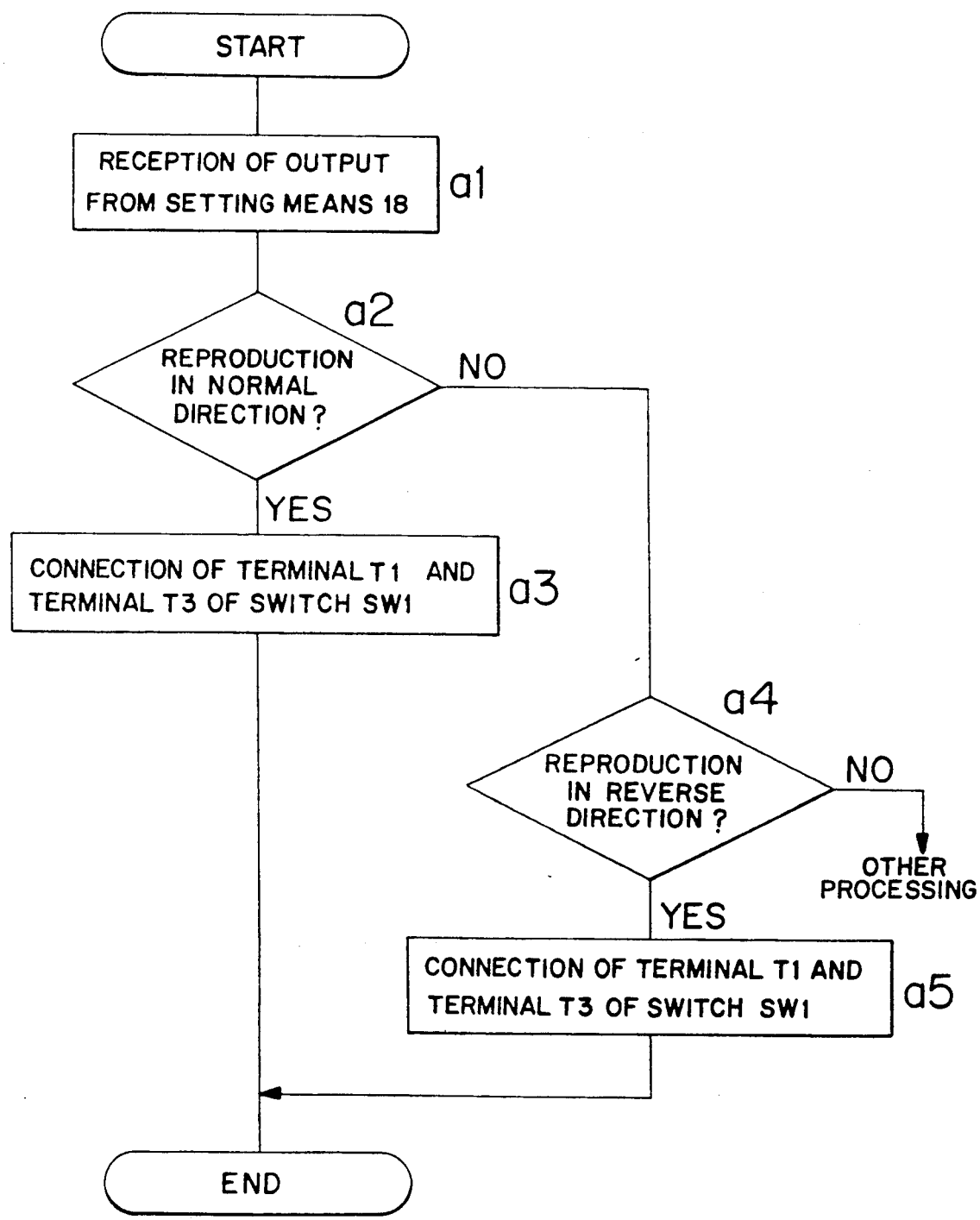
FIG. 5 is a flow chart explaining the operation of a control circuit 10.

FIG. 5 is a flow chart for explaining the control operation of the control circuit 10. At step a1, when the output from the setting means 18 is received, it is judged at step a2 whether it is reproduction in normal direction or not. When it is a reproduction in normal direction, at step a3, the control circuit 10 connects the terminals T3 and T1 of the switch SW1.

When it is not a reproduction in normal direction at step a2, it is judged at step a4 whether it is reproduction in reverse direction or not. When it is a reproduction in reverse direction, the control circuit 10 connects, at step a5, the terminals T3 and T2 of the switch SW1. When it is not a reproduction in reverse direction at step a4, other processing is done.

In such magnetic tape reproducing apparatus 15, when reproducing in the normal direction, the control signal output from the control circuit 10 to the switch SW1 is at high level, and the switch SW1 connects the terminals T1 and T3 electrically. Therefore, at the terminal S1 of the switch SW2, the signal Ra shown in FIG. 6 (2) is led out, and at the terminal S2 of the switch SW3, the signal Rb shown in FIG. 6 (3) is led out.

Figure 6:
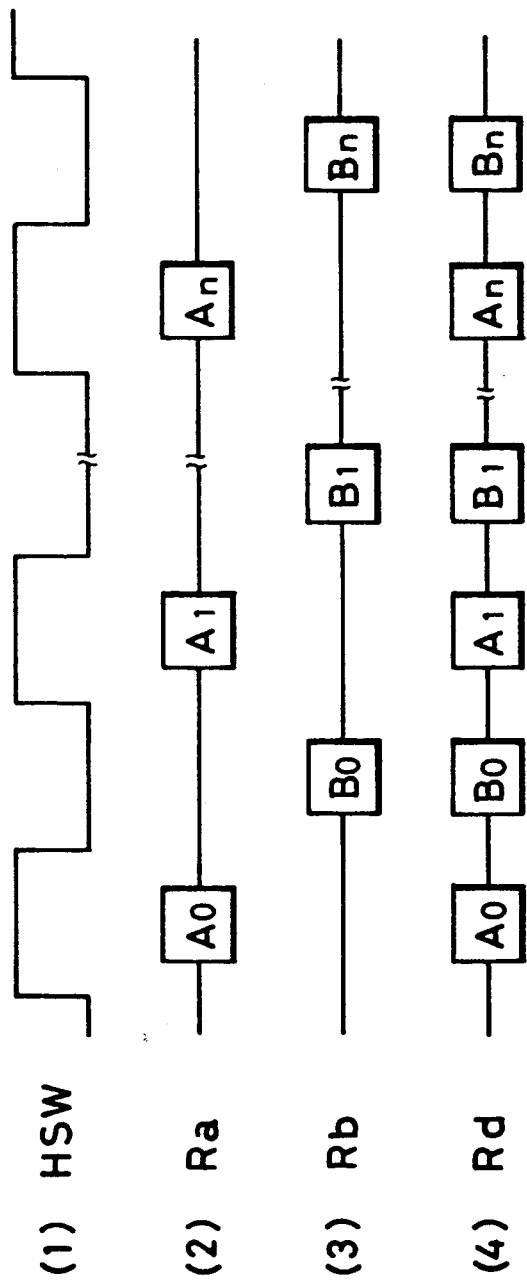
FIG. 6 is a timing chart explaining the operation in reproduction in normal direction of the magnetic tape reproducing apparatus 15.

The track identification signal HSW is at high level when the data of track Ai is reproduced as shown in FIG. 6 (1), and is at low level when the data of track Bi is reproduced. The switch SW2 changes over the signals Ra, Rb selectively while the magnetic heads 3a, 3b are reading out the data on tracks Ai, Bi of the magnetic tape 1 respectively, and leads out the signal as signal Rd to the signal processing circuit 9. This signal processing circuit 9 processes the data of the signal Rd which is led out in the high level period of the track identification signal HSW and in the low level period succeeding this high level period, as data of one frame. Therefore, when the magnetic tape reproducing apparatus 15 reproduces the magnetic tape 1 shown in FIG. 1 in the normal direction, as shown in FIG. 6 (4), the data of tracks A0, B0, A1, B1, ..., An, Bn are led out in this sequence as the signal Rd to the signal processing circuit 9. In this way, the magnetic tape reproducing apparatus 15 correctly processes the data of tracks Ai, Bi composing one frame Fi when reproducing in the normal direction.

FIG. 7 is a timing chart for explaining the operation of the magnetic tape reproducing apparatus 15 in the reproduction in reverse direction. The detecting circuit 8 is synchronized with the rotation of the rotary drum 2, and outputs the track identification signal HSW which becomes high level including the time of reproduction of track Ai and low level including the time of reproduction of track Bi, to the changeover switch SW2. This track identification signal HSW is shown in FIG. 7 (1).

This changeover switch SW2 sets the terminals S1, S2 in conductive state when the track identification signal HSW is at high level, and leads out the signal Ra output from the amplifier 4a into the signal processing circuit 9. The signal Ra output from the amplifier 4a is shown in FIG. 7 (2).

The signal Rb output from the amplifier 4b shown in FIG. 7 (3) is delayed for the portion of one period of rotation of the rotary drum 2 by the delay circuit 6. The signal Rc output from the delay circuit 6 is as shown in FIG. 7 (4).

When reproducing in the reverse direction, the control signal output from the control circuit 10 to the changeover switch SW1 is at low level, and the changeover switch SW1 sets the terminals T2, T3 in conductive state, so that the signal Rc from the delay circuit 6 is led out into the terminal T3.

The changeover switch SW2 sets the terminals S1 and S2 in conductive state while the signal Ra from the amplifier 4a is being output, and sets the terminals S2 and S3 in conductive state while the signal Rc from the delay circuit 6 is being output. Therefore, the signals Ra and Rc are changed over, and output as signal Rd to the signal processing circuit 9. The signal Rd is shown in FIG. 7 (5).

The signal processing circuit 9 processes the signals entered from the rise to the next rise of the track identification signal HSW as signals of one frame. Therefore, the signal processing circuit 9 can correctly process the signals read out from the tracks Ai and Bi as the date of one frame Fi, so that correct reproduction data can be output.

Thus, in this embodiment, reproduction in reverse direction may be realized normally only by adding the delay circuit 6 and changeover switch SW1 to the conventional magnetic tape reproducing apparatus of rotary drum head type.

In the foregoing embodiment, the magnetic tape reproducing apparatus 15 of the rotary drum head type is explained, but the invention may be also embodied in other magnetic tape reproducing apparatus such as video tape reproducing apparatus as far as it is a reproducing apparatus of rotary drum head type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reproducing method using movable magnetic tape and rotary drum heads comprising the steps of:
    (a) reading the digital signals recorded on the magnetic tape by using a rotary drum, which includes magnetic heads having two different azimuth angles, the heads being attached o the drum nd spaced rome each other in a peripheral direction, the magnetic tape, including one track formed by a magnetic head having one azimuth angle, and a second track formed by a magnetic head having the other azimuth angle,
    (b) reading one track using the magnetic head having one azimuth angle, (c) emitting signals, representing first one track and then the second track, in this sequence when reproducing in a normal direction, (e) reproducing in a direction reverse to the normal direction including delaying a signal representing the data content of the second track so that reading of the signal representing the data content of the first track is effectively accomplished before reading a signal representing the data content of the second track, (f) receiving the output of the magnetic head having one azimuth angle and the signal representing the data content of the second track delayed in step (e), and (g) emitting track signals in the same sequence as in eh reproduction direction as in the normal direction.

2. The method according to claim 1 wherein digital signals are stored in the magnetic tape.

3. The method according to claim 2 wherein the digital signals are audio signals.

4. The method according to claim 2, wherein the digital signals are video signals.

5. A magnetic tape reproducing apparatus using rotary drum heads comprising:

a rotary drum including, at least one pair of magnetic heads, each of said at least one pair having magnetic heads of two different azimuth angles at a spacing in the peripheral direction, the rotary drum being rotatable in a predetermined direction;

a magnetic tape sliding in cannot with the rotary drum;

means for driving the magnetic tape for moving the magnetic tape in a fist and second predetermined direction, the second direction being an opposite direction to the first direction, wherein the magnetic tape having a frame composed thereon of a pair of tracks, one track formed one read by a magnetic head having one azimuth angle, and other track formed and read by a magnetic head having the other azimuth angle;

means for detecting reading states of the different tracks formed by the magnetic heads having the two different azimuth angles;

a delay circuit for delaying output signals of one of the magnetic heads for one frame period;

a first changeover switch for receiving the output signals of one magnetic head or the output signals of the delay circuit;

a second changeover switch for receiving the output signals of another magnetic head, having a different azimuth angle, directly or the output signals of the first changeover switch by changing over the connection state of the two in every half frame period;

means for setting the first and second moving directions of the magnetic tape operatively connected to a means for divine the magnetic tape in said moving directions; and means for actuating the first changeover switch so that it will receive signals only from one magnetic head when the first moving direction is set and for receiving signals of the delay circuit when the second running direction is set.

6. The apparatus according to claim 5 wherein digital signals are stored in the magnetic tape.

7. The apparatus according to claim 6 wherein the digital signals are audio signals.

8. The apparatus according to claim 5 wherein the digital signals are video signals.

9. The method of claim 1 wherein in step (e), the reverse direction of the tape is at a speed which is a normal operating speed for reproduction.

10. The apparatus of claim 5 wherein the delay circuit includes a memory for delaying the output of the magnetic heads for a period of one frame during reproduction in a second direction at a normal operating speed of the apparatus.

11. The apparatus of claimed in claimed 5, wherein said means for actuating is a control circuit operatively connected to said first and second changeover switches for changing the fist switch to receive signals through the delay circuit and in the second direction for receiving signals only from a magnetic head through an amplifier.

* * * * *